United States Patent
Kitagawa et al.

(10) Patent No.: US 12,433,970 B2
(45) Date of Patent: Oct. 7, 2025

(54) METHOD FOR MANUFACTURING MEDICAL DEVICE

(71) Applicant: TORAY INDUSTRIES, INC., Tokyo (JP)

(72) Inventors: Rumiko Kitagawa, Otsu (JP); Masataka Nakamura, Otsu (JP)

(73) Assignee: TORAY INDUSTRIES, INC., Tokyo (JP)

( * ) Notice: Subject to any disclaimer, the term of this patent is extended or adjusted under 35 U.S.C. 154(b) by 865 days.

(21) Appl. No.: 17/620,197

(22) PCT Filed: Aug. 19, 2020

(86) PCT No.: PCT/JP2020/031219
§ 371 (c)(1),
(2) Date: Dec. 17, 2021

(87) PCT Pub. No.: WO2021/039519
PCT Pub. Date: Mar. 4, 2021

(65) Prior Publication Data
US 2022/0249731 A1    Aug. 11, 2022

(30) Foreign Application Priority Data
Aug. 27, 2019   (JP) ................................ 2019-154480

(51) Int. Cl.
| | | |
|---|---|---|
| *B29D 11/00* | (2006.01) | |
| *A61L 15/24* | (2006.01) | |
| *A61L 29/08* | (2006.01) | |
| *A61L 29/12* | (2006.01) | |
| *A61L 29/14* | (2006.01) | |
| *A61L 31/10* | (2006.01) | |
| *A61L 31/12* | (2006.01) | |
| *A61L 31/14* | (2006.01) | |
| *G02C 7/04* | (2006.01) | |

(52) U.S. Cl.
CPC ............... *A61L 15/24* (2013.01); *A61L 29/08* (2013.01); *A61L 29/12* (2013.01); *A61L 29/14* (2013.01); *A61L 31/10* (2013.01); *A61L 31/12* (2013.01); *A61L 31/14* (2013.01); *G02C 7/04* (2013.01)

(58) Field of Classification Search
CPC ........................ B29D 11/0003; G02C 7/049
See application file for complete search history.

(56) References Cited

U.S. PATENT DOCUMENTS

| | | | | |
|---|---|---|---|---|
| 4,787,904 A | * | 11/1988 | Severin ................. | A61F 2/1613 623/6.56 |
| 5,981,675 A | * | 11/1999 | Valint, Jr. ............. | C08F 290/04 526/279 |
| 2008/0100796 A1 | * | 5/2008 | Pruitt ............... | B29D 11/00865 427/164 |
| 2012/0026457 A1 | * | 2/2012 | Qiu .................. | B29D 11/00865 523/108 |
| 2012/0314185 A1 | * | 12/2012 | Bauman ................. | G02B 1/043 977/782 |
| 2013/0188124 A1 | * | 7/2013 | Li ..................... | B29D 11/00038 427/164 |
| 2014/0005375 A1 | | 1/2014 | Tramontano et al. | |
| 2014/0198294 A1 | * | 7/2014 | Nakamura ............. | G02C 7/165 351/159.04 |
| 2014/0240660 A1 | * | 8/2014 | Fujisawa ................. | A61L 27/50 524/502 |
| 2014/0333893 A1 | | 11/2014 | Kitagawa et al. | |
| 2015/0094393 A1 | * | 4/2015 | Holland .................... | C08F 2/48 522/66 |
| 2015/0166205 A1 | * | 6/2015 | Qiu .................. | B29D 11/00865 53/431 |
| 2016/0061995 A1 | * | 3/2016 | Chang .................. | C09D 179/04 427/164 |
| 2016/0062142 A1 | * | 3/2016 | Zhang ...................... | C08J 7/043 427/164 |
| 2017/0160565 A1 | | 6/2017 | Muya et al. | |
| 2017/0165932 A1 | * | 6/2017 | Qian ................ | B29D 11/00038 |
| 2019/0022282 A1 | | 1/2019 | Kitagawa et al. | |
| 2020/0139653 A1 | | 5/2020 | Kitagawa et al. | |
| 2020/0215226 A1 | | 7/2020 | Kitagawa et al. | |

FOREIGN PATENT DOCUMENTS

| | | | |
|---|---|---|---|
| CN | 103524761 A | 1/2014 | |
| JP | 2015-502438 A | 1/2015 | |
| WO | 2017023374 A * | 2/2013 | ............. A61L 27/18 |
| WO | WO 2013/024880 A1 | 2/2013 | |
| WO | WO 2018/207644 A1 | 11/2018 | |
| WO | WO 2019/031477 A1 | 2/2019 | |

OTHER PUBLICATIONS

JP-2017023374-A translation . 2017 (Year: 2017).*
Extended European Search Report dated Aug. 21, 2023 for Application No. 20858049.8.
International Search Report, issued in PCT/JP2020/031219, PCT/ISA/210, dated Oct. 6, 2020.
Written Opinion of the International Searching Authority, issued in PCT/JP2020/031219, PCT/ISA/237, dated Oct. 6, 2020.

* cited by examiner

*Primary Examiner* — Cachet I Proctor

(74) *Attorney, Agent, or Firm* — Birch, Stewart, Kolasch & Birch, LLP

(57) ABSTRACT

The present invention provides a method of manufacturing a medical device including a substrate and a hydrophilic polymer layer, including the steps of: placing the substrate in a solution containing a hydrophilic polymer and a normal salt in an amount ranging from 1.0 to 20% by mass; and heating the solution at a temperature ranging from 50° C. to 140° C. The present invention provides a simple method of manufacturing a medical device having excellent durability and imparted with hydrophilicity.

11 Claims, No Drawings

METHOD FOR MANUFACTURING MEDICAL DEVICE

TECHNICAL FIELD

The present invention relates to methods of manufacturing medical devices.

BACKGROUND ART

There have hitherto been used devices using soft materials made of resins such as a silicone rubber and hydrogel and devices using hard materials such as metal and glass in various fields.

Applications of devices using soft materials include medical devices for introduction into a living body and for covering a surface of a living body, biotechnology devices such as cell culture sheets and scaffold materials for tissue regeneration, and cosmetic devices such as facial packs.

Applications of devices using hard materials include electric appliances such as personal computers, mobile phones, displays, etc., ampules for use in injections, and use as diagnostic and analysis tools such as capillaries, biosensing chips, and the like.

When various devices are, for example, introduced into a living body as a medical device or attached to a surface of a living body, it is important to modify the surface of the medical device. If it is possible to impart better properties such as hydrophilicity, lubricity, biocompatibility, and medicinal effects than before surface modification to the medical device by surface modification, an improvement in tactile sensation, reduction of discomfort, improvements of symptoms, and the like in users (patients, etc.) can be expected.

Various methods have been known as methods for modification of the surface of a substrate used in medical devices.

For example, methods of imparting good water wettability to the surface of a substrate by heating the substrate in a solution containing a polymer having a hydroxy group with pH from 2.0 to 6.0 have been disclosed (see, for example, Patent Documents 1 and 2).

In addition, a method of improving the comfort of a substrate by autoclaving the substrate in a solution containing one or more polymer material, with pH ranging from 6 to 8 has been known (see, for example, Patent Document 3).

CITATION LIST

Patent Literature

Patent Literature 1: WO2017/146102
Patent Literature 2: WO2019/031477
Patent Literature 3: Japanese Translated PCT Patent Application Laid-open No. 2019-507908

SUMMARY OF INVENTION

Technical Problem

However, in the methods for modification of the surface of a substrate as disclosed in Patent Literatures 1 and 2, pH of the heated solution containing a substrate is 6.0 or lower. For this reason, in the case where the substrate is used in a medical device such as an ophthalmic lens, additional steps have been required of washing the substrate in a neutral solution and sterilizing it in order to remove stimuli to eyes. When pH of the solution to be used in heating is 6.0 or higher to avoid such additional steps, it has been difficult to modify the surface of the substrate by the methods disclosed in Patent Literatures 1 and 2.

There is restriction in the method disclosed in Patent Literature 3 to a method comprising immersing a substrate in a solution containing a specific surfactant (polyoxyethylene-polyoxybutylene block copolymer) and a specific wetting agent (high molecular weight copolymer of N-vinylpyrrolidone and at least one amino-containing vinyl monomer). In addition, the requirement of two agents, a surfactant and a wetting agent, for surface modification may have increased the manufacturing cost.

The present invention has been made in view of aforementioned problems of conventional art. Accordingly, an object of the present invention is to provide a simple method capable of imparting a hydrophilic polymer layer with excellent durability to the surface of a medical device in a wider pH range than the pH conditions in the conventional art, which has not been applicable in the conventional surface modification methods, and using less types of materials.

Solution to Problem

To achieve the above object, the present invention is a method of manufacturing a medical device comprising a substrate and a hydrophilic polymer layer, comprising the steps of:
  placing the substrate in a solution containing a hydrophilic polymer and a normal salt in an amount ranging from 1.0 to 20% by mass; and
  heating the solution at a temperature ranging from 50° C. to 140° C.

Advantageous Effects of Invention

According to the present invention, a medical device can simply be imparted with a hydrophilic polymer layer with excellent durability in a wider pH range than pH conditions in the conventional art and using less types of materials than the conventional art.

DESCRIPTION OF EMBODIMENTS

The method of manufacturing a medical device in the present invention is for manufacturing a medical device comprising a substrate and a hydrophilic polymer layer.

In embodiments of the present invention, the shape of the medical device is, for example, a lenticular, tubular, sheet, film, or container-like shape.

Examples of a lenticular medical device include an ophthalmic lens, such as a contact lens, an intraocular lens, an artificial cornea, a corneal inlay, a corneal onlay, and an eyeglass lens. In one most preferred embodiment of the present invention, the lenticular medical device is an ophthalmic lens, especially a contact lens.

Examples of a tubular medical device include an infusion tube, a gas delivery tube, a drainage tube, a blood circuit, a coating tube, a catheter, a stent, a sheath, a tube connector, an access port, and a hollow fiber for heart-lung machine.

Examples of a sheet or film medical device include a skin dressing material, a wound dressing material, a skin protection material, a skin medicine carrier, a biosensor chip, and an endoscope covering material.

Examples of a medical device having a container-like shape include a drug carrier, a cuff, and a drainage bag.

In the present invention, the medical device is an ophthalmic lens, a skin dressing material, a wound dressing material, a skin protection material, a skin medicine carrier, an infusion tube, a gas delivery tube, a drainage tube, a blood circuit, a coating tube, a catheter, a stent, a sheath, a biosensor chip, or a covering material for heart-lung machine or an endoscope. More preferably, the medical device is an ophthalmic lens.

Especially, in one of the most preferred embodiments of the present invention, the ophthalmic lens is a contact lens. In the present invention, the contact lens may be a contact lens for an orthoptic or cosmetic purpose.

It is possible to use, as a substrate of the medical device, both a hydrous substrate and a non-hydrous substrate. Examples of the material of the hydrous substrate include a hydrogel and a silicone hydrogel. The silicone hydrogel is particularly preferable because of having flexibility which imparts excellent comfort, and high oxygen permeability. On the other hand, examples of the non-hydrous substrate include a low water content soft material and a low water content hard material. Thus, in the method of manufacturing a medical device of the present invention, the substrate preferably comprises one or more material selected from the group consisting of a hydrogel, a silicone hydrogel, a low water content soft material, and a low water content hard material.

The method of the present invention is applicable to both an ordinary hydrogel containing no silicone and a hydrogel containing silicone (hereinafter referred to as "silicone hydrogel") in the case of the hydrous substrate. It is possible to use particularly suitably for the silicone hydrogel since surface physical properties can be significantly improved.

Hereinafter, the United States Adopted Names (USAN) may be used to refer to materials. In the USAN, there are cases where variations of a material are expressed by adding symbols such as A, B, and C at the end. However, as used herein, all variations are expressed when no symbol is added at the end. For example, when simply written as "ocufilcon", it expresses all variations, such as "ocufilcon A", "ocufilcon B", "ocufilcon C", "ocufilcon D", "ocufilcon E", and "ocufilcon F."

In the method of manufacturing a medical device of the present invention, the hydrogel is preferably a hydrogel selected from the group consisting of tefilcon, tetrafilcon, helfilcon, mafilcon, polymacon, hioxifilcon, alfafilcon, omafilcon, hioxifilcon, nelfilcon, nesofilcon, hilafilcon, acofilcon, deltafilcon, etafilcon, focofilcon, ocufilcon, phemfilcon, methafilcon, and vilfilcon.

For example, a contact lens composed of a hydrogel is classified into contact lens classification Groups 1 to 4 defined by Food and Drug Administration (FDA). Especially, Group 2 and Group 4 are more preferable, and Group 4 is particularly preferable because of exhibiting good water wettability and antifouling properties.

Group 1 represents a nonionic hydrogel lens having a moisture content of less than 50% by mass. Specific examples thereof include tefilcon, tetrafilcon, helfilcon, mafilcon, polymacon, and hioxifilcon.

Group 2 represents a nonionic hydrogel lens having a moisture content of 50% by mass or more. Specific examples thereof include alfafilcon, omafilcon, hioxifilcon, nelfilcon, nesofilcon, hilafilcon, and acofilcon. Omafilcon, hioxifilcon, nelfilcon, and nesofilcon are more preferable, omafilcon and hioxifilcon are still more preferable, and omafilcon is particularly preferable because of exhibiting satisfactory water wettability and antifouling properties.

Group 3 represents an ionic hydrogel lens having a moisture content of less than 50% by mass. A specific example thereof includes deltafilcon.

Group 4 represents an ionic hydrogel lens having a moisture content of 50% by mass or more. Specific examples thereof include etafilcon, focofilcon, ocufilcon, phemfilcon, methafilcon, and vilfilcon. Etafilcon, focofilcon, ocufilcon, and phemfilcon are more preferable, etafilcon and ocufilcon are still more preferable, and etafilcon is particularly preferable because of exhibiting satisfactory water wettability and antifouling properties.

Specific example of the silicone hydrogel is preferably a silicone hydrogel selected from the group belonging to contact lens classification Group 5 defined by Food and Drug Administration (FDA).

The silicone hydrogel is preferably a polymer which has a silicon atom in the main chain and/or side chain and has hydrophilicity, and examples thereof include a copolymer of a monomer having a siloxane bond and a hydrophilic monomer.

Specifically, the silicone hydrogel is preferably a silicone hydrogel selected from the group consisting of lotrafilcon, galyfilcon, narafilcon, senofilcon, comfilcon, enfilcon, balafilcon, efrofilcon, fanfilcon, somofilcon, samfilcon, olifilcon, asmofilcon, formofilcon, stenfilcon, abafilcon, mangofilcon, riofilcon, sifilcon, larafilcon, and delefilcon. Especially, lotrafilcon, galyfilcon, narafilcon, senofilcon, comfilcon, enfilcon, stenfilcon, somofilcon, delefilcon, balafilcon, and samfilcon are more preferable, lotrafilcon, narafilcon, senofilcon, comfilcon, and enfilcon are still more preferable, and narafilcon, senofilcon, and comfilcon are particularly preferable because of exhibiting satisfactory water wettability and lubricity.

The low water content soft material and the low water content hard material are preferably a material having a silicon atom because of exhibiting high oxygen permeability capable of supplying sufficient oxygen to the cornea in the case of, for example, use in a medical device such as an ophthalmic lens.

For example, when the low water content hard material is a contact lens, specific example of the low water content hard material is preferably a low water content hard material selected from the group belonging to contact lens classification defined by Food and Drug Administration (FDA).

Such a low water content hard material is preferably a polymer having a silicon atom in the main chain and/or side chain. Examples thereof include polymers having a siloxane bond. Among these polymers having a silicon atom, those in which the silicon atom is contained in the polymer by a siloxane bond are preferable from the viewpoint of the oxygen permeability. Specific examples of such polymers include tris(trimethylsilyloxy)silylpropyl methacrylate, polydimethylsiloxane having a double bond at both the ends, homopolymers using silicone-containing (meth)acrylate, and copolymers of these monomers and other monomers.

Specifically, the low water content hard material is preferably a material selected from the group consisting of neofocon, pasifocon, telefocon, silafocon, paflufocon, petrafocon, and fluorofocon. Especially, neofocon, pasifocon, telefocon, and silafocon are more preferable, neofocon, pasifocon, and telefocon are still more preferable, and neofocon is particularly preferable because of exhibiting satisfactory water wettability and antifouling properties.

In embodiments of the present invention, when the medical device is other than a contact lens, suitable examples of the low water content hard material include polyethylene, polypropylene, polysulfone, polyetherimide, polystyrene, polymethyl methacrylate, polyamide, polyester, an epoxy resin, polyurethane, and polyvinyl chloride. Especially, the low water content hard material is more preferably selected from polysulfone, polystyrene, polymethyl methacrylate, and polyamide, and is particularly preferably polymethyl methacrylate because of exhibiting satisfactory water wettability and antifouling properties.

Specific examples of the low water content soft material include low water content soft materials used in medical devices as mentioned in WO2013/024799, in which the moisture content is 10% by mass or less, the elastic modulus is 100 kPa or more and 2,000 kPa or less, and the tensile elongation is 50% or more and 3,000% or less. Elastofilcon is also suitable.

In the present invention, when the medical device is other than ophthalmic lenses including contact lenses, suitable examples of the low water content soft material include silicone elastomers, soft polyurethane, polyvinyl acetate, ethylene-vinyl acetate copolymers, soft polyester resins, soft acrylic resins, soft polyvinyl chloride, natural rubber, and various synthetic rubbers According to the present invention, it is possible to impart moderate hydrophilicity (water wettability) to the surface of the medical device whether the substrate is hydrous or low hydrous. Therefore, the moisture content of the substrate may be from 0 to 99% by mass. The moisture content of the substrate is preferably 0.0001% by mass or more, and particularly preferably 0.001% by mass or more, since the effect of imparting moderate hydrophilicity to the surface of the medical device is further enhanced. The moisture content of the substrate is preferably 60% by mass or less, more preferably 50% by mass or less, and still more preferably 40% by mass or less.

When the medical device is a contact lens, since it is easy to ensure the movement of the lens in eyes, the moisture content of the substrate is preferably 15% by mass or more, and sill more preferably 20% by mass or more.

The method of manufacturing a medical device according to the present invention comprises the steps of:
placing the substrate in a solution containing a hydrophilic polymer and a normal salt in an amount ranging from 1.0 to 20% by mass; and
heating the solution at a temperature ranging from 50° C. to 140° C.

The hydrophilic polymer used in the method of manufacturing a medical device according to the present invention is, usually, a different material from the substrate. However, as long as a predetermined effect can be obtained, the material may be the same material as that constituting the substrate.

The hydrophilic polymer described above is composed of a material having hydrophilicity. As long as the development of the hydrophilicity is not impaired, additives other than the material may be included. Here, the material having hydrophilicity is a material which is soluble in 100 parts by mass of water or a mixture of 100 parts by mass of water and 100 parts by mass of tert-butanol at room temperature (20 to 23° C.) in the amount of preferably 0.0001 parts by mass or more, more preferably 0.01 parts by mass or more, still more preferably 0.1 parts by mass or more, and particularly preferably 1 part by mass or more.

The hydrophilic polymer used in the present invention preferably has a molecular weight of 2,000 to 1,500,000. The molecular weight is more preferably 5,000 or more, and still more preferably 10,000 or more. The molecular weight is more preferably 1,200,000 or less, and still more preferably 1,000,000 or less. Here, a weight average molecular weight in terms of polyethylene glycol or polyethylene oxide measured by a gel permeation chromatography method (aqueous solvent) is used as the molecular weight.

With respect to the concentration of a hydrophilic polymer in the solution during manufacture, too high concentration may lead to an increase in difficulty of handling during manufacture due to an increase in viscosity. Thus, in the method of manufacturing a medical device in the present invention, the concentration of a hydrophilic polymer in the solution ranges preferably from 0.01 to 20% by mass. The concentration of the hydrophilic polymer is more preferably 0.02% by mass or more, and still more preferably 0.03% by mass or more. The concentration of the hydrophilic polymer is more preferably 10% by mass or less, still more preferably 5% by mass or less, yet more preferably 1% by mass, and most preferably 0.8% by mass or less.

Preferably, the hydrophilic polymer has an amide group. The hydrophilic polymer having an amide group is preferable since it exhibits moderate viscosity when dissolved in water and can form a hydrophilic polymer layer with excellent durability. As the hydrophilic polymer having an amide group, a polymer of a monomer having an amide group alone or a copolymer thereof can be used. The term "amide group" as used herein refers to a group having the structure represented by N—C═O.

In view of ease of polymerization, the monomer having an amide group is preferably a monomer selected from a monomer having a (meth)acrylamide group and N-vinylcarboxylic acid amide (including cyclic one). Suitable examples of such a monomer include N-vinylpyrrolidone, N-vinylcaprolactam, N-vinylacetamide, N-methyl-N-vinylacetamide, N-vinylformamide, N,N-dimethylacrylamide, N,N-diethylacrylamide, N-isopropylacrylamide, N-methylacrylamide, N-ethylacrylamide, N-butylacrylamide, N-tert-butylacrylamide. N-hydroxymethylacrylamide, N-methoxymethylacrylamide, N-ethoxymethylacrylamide, N-propoxymethylacrylamide, N-isopropoxymethylacrylamide, N-(2-hydroxyethyl)acrylamide, N-butoxymethylacrylamide, N-isobutoxymethylacrylamide, N-hydroxymethylmethacrylamide, N-methoxymethylmethacrylamide, N-ethoxymethylmethacrylamide, N-propoxymethylmethacrylamide, N-butoxymethylmethacrylamide, N-isobutoxymethylmethacrylamide, acryloylmorpholine, and acrylamide. Of these, N-vinylpyrrolidone. N,N-dimethylacrylamide, and N,N-diethylacrylamide are preferable in view of the durability, and N,N-dimethylacrylamide is particularly preferable.

A copolymer of the monomer having an amide group described above, or a polymer of the monomer alone can be suitably used.

The hydrophilic polymer described above may have an acidic group in addition to the amide group. The hydrophilic polymer having an amide group and an acidic group is preferable because it can form a hydrophilic polymer layer excellent not only in water wettability but also in antifouling properties against body fluid and the like. The acidic group as used herein is preferably, for example, a group selected from a carboxy group and a sulfonic group, and particularly preferably a carboxy group. The carboxy group or the sulfonic group may be in the form of a salt.

Examples of the hydrophilic polymer having an amide group and an acidic group include polyamides having a carboxyl group, and a copolymer of a monomer having an amide group and a monomer having an acidic group.

Suitable examples of the polyamides having a carboxyl group include polyamino acids such as polyaspartic acid and polyglutamic acid, and polypeptides.

As the monomer having an acidic group, a monomer selected from methacrylic acid, acrylic acid, vinylbenzoic acid, thiophene-3-acetic acid, 4-styrenesulfonic acid, vinylsulfonic acid, 2-acrylamido-2-methylpropanesulfonic acid, and salts thereof can be suitably used.

As the monomer having an amide group, the monomer described above can be suitably used.

When the hydrophilic polymer having an amide group and an acidic group is a copolymer, preferred specific examples thereof include a (meth)acrylic acid/N-vinylpyrrolidone copolymer, a (meth)acrylic acid/N,N-dimethyl acrylamide copolymer, a 2-acrylamide-2-methylpropanesulfonic acid/N-vinylpyrrolidone copolymer, and a 2-acrylamide-2-methylpropanesulfonic acid/N,N-dimethyl acrylamide copolymer. A (meth)acrylic acid/N,N-dimethylacrylamide copolymer is particularly preferable.

When using a copolymer of a monomer having an amide group and a monomer having an acidic group, the copolymerization ratio thereof is preferably in a range of 1/99 to 99/1 in terms of [mass of the monomer having an acidic group]/[mass of the monomer having an amide group]. The copolymerization ratio of the monomer having an acidic group is more preferably 2% by mass or more, still more preferably 5% by mass or more, and yet more preferably 10% by mass or more. The copolymerization ratio of the monomer having an acidic group is more preferably 90% by mass or less, still more preferably 80% by mass or less, and yet more preferably 70% by mass or less. The copolymerization ratio of the monomer having an amide group is more preferably 10% by mass or more, still more preferably 20% by mass or more, and yet more preferably 30% by mass or more. The copolymerization ratio of the monomer having an amide group is more preferably 98% by mass or less, still more preferably 95% by mass or less, and yet more preferably 90% by mass or less. When the copolymerization ratios of the monomer having an acidic group and the monomer having an amide group are in the above range, functions such as water wettability and antifouling properties against body fluid are easily developed.

Instead of the copolymer of a monomer having an amide group and a monomer having an acidic group described above, a plurality of monomers having different acidic and amide groups can also be copolymerized. One or more monomers without acidic group or amide group can also be copolymerized.

Suitable examples of the monomer without acidic group or amide group include hydroxyethyl (meth)acrylate, hydroxypropyl (meth)acrylate, hydroxybutyl (meth)acrylate, hydroxyethyl(meth)acrylamide, glycerol (meth)acrylate, caprolactone-modified 2-hydroxyethyl (meth)acrylate, N-(4-hydroxyphenyl)maleimide, hydroxystyrene, and vinyl alcohol (carboxylic acid vinyl ester as a precursor). Of these, in view of ease of polymerization, a monomer having a (meth)acryloyl group is preferable and a (meth)acrylic acid ester monomer is more preferable. In view of improving the antifouling properties against body fluid, hydroxyethyl (meth)acrylate, hydroxypropyl (meth)acrylate, and glycerol (meth)acrylate are preferable, and hydroxyethyl (meth)acrylate is particularly preferable. It is also possible to use a monomer having functions such as hydrophilicity, antibacterial properties, antifouling properties, and medicinal effects.

Specific examples of the monomer having antibacterial properties include a monomer having a quaternary ammonium salt. Examples thereof include monomers having antibacterial properties, such as imidazolium salt monomer disclosed in Japanese Translated PCT Patent Application Laid-open No. 2010-88858, as well as (3-acrylamidepropyl) trimethylammonium chloride, trimethyl-2-methachloryloxyethylammonium chloride, and 2-methacryloyloxyethyl phosphorylcholine.

When a copolymer of a monomer having an amide group and a monomer having an acidic group is copolymerized with a monomer having neither acidic group nor amide group (hereinafter referred to as "third monomer"), the copolymerization ratio of the monomer having an acidic group is more preferably 2% by mass or more, still more preferably 5% by mass or more, and yet more preferably 10% by mass or more. The copolymerization ratio of the monomer having an acidic group is more preferably 90% by mass or less, still more preferably 80% by mass or less, and yet more preferably 70% by mass or less. The copolymerization ratio of the monomer having an amide group is more preferably 10% by mass or more, still more preferably 20% by mass or more, and yet more preferably 30% by mass or more. The copolymerization ratio of the monomer having an amide group is more preferably 98% by mass or less, still more preferably 95% by mass or less, and yet more preferably 90% by mass or less. The copolymerization ratio of the third monomer is more preferably 2% by mass or more, still more preferably 5% by mass or more, and yet more preferably 10% by mass or more. The copolymerization ratio of the third monomer is more preferably 90% by mass or less, still more preferably 80% by mass or less, and yet more preferably 70% by mass or less.

When the copolymerization ratios of the monomer having an acidic group, the monomer having an amide group, and the third monomer are in the above range, functions such as water wettability and antifouling properties against body fluid are easily developed.

As long as properties required to the medical device are not impaired, additives other than the above materials may be included in the hydrophilic polymer layer. In addition to the hydrophilic polymer having an amide group, one or more other hydrophilic polymers may be included in the hydrophilic polymer layer. Due to the tendency for the manufacturing method to be more complex, it is preferable that the hydrophilic polymer layer is made of only one hydrophilic polymer having an amide group.

Here, one polymer means a polymer or a polymer group (isomers, complexes, etc.) produced by one synthesis reaction. In the case of a copolymerized polymer using a plurality of monomers, even though the monomer species constituting the copolymerized polymer are the same, the case where other polymers synthesized by changing the monomer compounding ratio is not said to be made of only one polymer.

The expression that the hydrophilic polymer layer is made of only one hydrophilic polymer having an amide group means that the hydrophilic polymer layer does not contain any polymer other than the hydrophilic polymer having an amide group, or even when the layer contains other polymers, it means that the content of the other polymers is preferably 3 parts by mass or less based on 100 parts by mass of the hydrophilic polymer having an amide group. The content of the other polymers is more preferably 0.1 parts by mass or less, and still more preferably 0.0001 parts by mass or less.

The method of manufacturing a medical device according to embodiments of the present invention comprises the steps of:

placing a substrate in a solution containing a hydrophilic polymer and a normal salt in an amount ranging from 1.0 to 20% by mass; and heating the solution.

The term "normal salt" means a salt not having hydrogen ion or hydroxide ion in its chemical structure. Specific examples thereof include $BaSO_4$, $BaCO_3$, $CaSO_4$, $CaCO_3$, $(CH_3COO)_2Ca$, NaCl, $Na_2CO_3$, $Na_2SO_4$, $NaNO_3$, $CH_3COONa$, KCl, $K_2SO_4$, $K_2CO_3$, $KNO_3$, $CH_3COOK$, LiCl, $LiSO_4$, $LiCO_3$, $LiNO_3$, and $CH_3COOLi$. From the viewpoint of solubility, a normal salt selected from $CaSO_4$, $CaCO_3$, $(CH_3COO)_2Ca$, NaCl, $Na_2CO_3$, $Na_2SO_4$, $NaNO_3$, $CH_3COONa$, KCl, $K_2SO_4$, $K_2CO_3$, $KNO_3$, and $CH_3COOK$ is preferable, and a normal salt selected from NaCl, $Na_2CO_3$, $Na_2SO_4$, $NaNO_3$, $CH_3COONa$, and KCl is more preferable, and NaCl or KCl is most preferable. Because of ease of formation of the hydrophilic polymer layer, one or more normal salts selected from the group consisting of these normal salts are preferably contained in the solution during manufacture.

With respect to the concentration of a normal salt in the solution during manufacture in the method of manufacturing a medical device according to embodiments of the present invention, the concentration of the normal salt in the solution is preferably from 1.0 to 20% by mass, because too high concentration results in high specific gravity of the solution and large buoyancy, which makes it difficult to immerse a substrate in the solution. The concentration of the normal salt is more preferably 2.0% by mass or more, and still more preferably 3.0% by mass or more. The concentration of the normal salt is more preferably 15% by mass or less, and still more preferably 10% by mass or less.

The concentration of the normal salt means the mass of the normal salt in the entire solution including the normal salt.

In the step of heating the substrate in a solution containing a hydrophilic polymer and a normal salt, the pH range of the solution is preferably in a range from 2.0 to 7.5 since turbidity does not occur in the solution, and a medical device having good transparency can be obtained.

The pH is more preferably 2.1 or higher, still more preferably 2.2 or higher, yet more preferably 2.4 or higher, and particularly preferably 2.5 or higher. The pH is more preferably 7.5 or lower, still more preferably 7.3 or lower, yet more preferably 7.2 or lower, and particularly preferably 7.0 or lower.

The pH of the solution can be measured using a pH meter (e.g., pH meter Eutech pH 2700 (Eutech Instruments)). Here, the pH of the solution containing a hydrophilic polymer means the pH value of the solution measured after adding all the hydrophilic polymer, a normal salt, and if necessarily, other components such as acids to the solution, followed by stirring at room temperature (23 to 25° C.) for 30 minutes with a rotor to make the solution uniform, and before placing a substrate in the solution and heating the substrate. In the present invention, the pH value is rounded off to one decimal place.

The pH of the solution can change when a heating operation is performed. The pH of the solution after a heating operation is preferably from 2.0 to 7.5. The pH after heating is more preferably 2.1 or higher, still more preferably 2.2 or higher, and particularly preferably 2.3 or higher. The pH after heating is more preferably 7.5 or lower, still more preferably 7.3 or lower, yet more preferably 7.2 or lower, and particularly preferably 7.0 or lower. When the pH of the solution after a heating operation is in the above range, the pH of the solution is maintained at appropriate conditions during the heating process, which results in achieving suitable physical properties of the thus obtained medical device. After the heating operation, the pH of the solution can be adjusted, for example, by performing a neutralization treatment or adding water. The pH of the solution after performing the heating operation as used herein is the pH before performing such pH adjustment.

Preferred examples of a solvent of the solution containing a hydrophilic polymer and a normal salt include water-soluble organic solvents, water, and mixed solvents thereof. Mixtures of water and water-soluble organic solvents, and water are preferable, and water is most preferable. Preferred water-soluble organic solvents are various water-soluble alcohols, more preferably alcohols having 6 or less carbon atoms, and still more preferably alcohols having 5 or less carbon atoms.

The pH of the solution can be adjusted by adding an acid to the solution. Preferably, such an acid is low molecular weight acid without a ring structure. As used herein, the low molecular weight means that the molecular weight is 500 or less, preferably 300 or less, and more preferably 250 or less. It is possible to use, as the low molecular weight acid without a ring structure, organic acids and inorganic acids. Preferred specific examples of the organic acids include acetic acid, citric acid, formic acid, ascorbic acid, trifluoromethanesulfonic acid, methanesulfonic acid, propionic acid, butyric acid, glycolic acid, lactic acid, and malic acid. Preferred specific examples of the inorganic acids include nitric acid, sulfuric acid, phosphoric acid, and hydrochloric acid. Of these, an organic acid is preferable, an organic acid having 1 to 20 carbon atoms is more preferable, and an organic acid having 2 to 10 carbon atoms is still more preferable, from the viewpoint of the facts that it is easy to obtain a more excellent hydrophilic polymer layer, safety to a living body is high, and it is easy to handle. Of these organic acids, an acid selected from acetic acid, citric acid, formic acid, ascorbic acid, trifluoromethanesulfonic acid, methanesulfonic acid, propionic acid, butyric acid, glycolic acid, lactic acid, and malic acid is preferable; an acid selected from formic acid, malic acid, citric acid, and ascorbic acid is more preferable; and citric acid or ascorbic acid is still more preferable. Of these inorganic acids, sulfuric acid is preferable, from the viewpoints of non-volatility, odorless, and easy to handle.

Since it becomes easy to finely adjust the pH, and the substrate is less likely to become turbid when the substrate is a material containing a hydrophobic component, a buffering agent is preferably added to the solution.

It is possible to use, as the buffering agent, a physiologically compatible known buffering agent. Examples are as follows: boric acid, borate (e.g., sodium borate), citric acid, citrates (e.g., potassium citrate), bicarbonate (e.g., sodium bicarbonate), phosphate buffer solution (e.g., $Na_2HPO_4$, $NaH_2PO_4$, and $KH_2PO_4$), TRIS (tris(hydroxymethyl)aminomethane), 2-bis(2-hydroxyethyl)amino-2-(hydroxymethyl)-1,3-propanediol, bis-aminopolyol, triethanolamine, ACES (N-(2-acetamide)-2-aminoethanesulfonic acid), BES (N,N-bis(2-hydroxyethyl)-2-aminoethanesulfonic acid), HEPES (4-(2-hydroxyethyl)-1-piperazineethanesulfonic acid), MES (2-(N-morpholino)ethanesulfonic acid), MOPS (3-[N-morpholino]-propanesulfonic acid), PIPES (piperazine-N,N'-bis(2-ethanesulfonic acid)). TES (N-[tris(hydroxymethyl)methyl]-2-aminoethanesulfonic acid), and salts thereof.

The buffering agent is used in an effective amount for achieving the desired pH. Usually, the buffering agent exists in the solution in an amount of 0.001% by mass to 2% by mass, preferably 0.01% by mass to 1% by mass, and more preferably 0.05% by mass to 0.30% by mass. The amount may be in a range combining any of the upper limits described above and any of the lower limits described above.

Examples of methods for the heating described above include a heating method (hot air), a high-pressure steam sterilization method, irradiation with electromagnetic waves (y ray, microwave, etc.), a dry heat method, and a flame method. From the viewpoint of the water wettability, lubricity, and shortening of the production process, when the pH of the solution to be heated is less than 6.0, a heating method (hot air) is most preferable, while when the pH is 6.0 or higher, a high-pressure steam sterilization method is most preferable. A constant-temperature oven, a hot air circulating oven, or an autoclave apparatus is preferably used as the apparatus.

The heating temperature is in a range from 50° C. to 140° C. from the viewpoints of obtaining a hydrophilic polymer layer exhibiting good water wettability and lubricity and exerting less influence on the strength of the medical device itself. The heating temperature is more preferably 55° C. or higher, still more preferably 60° C. or higher, yet more preferably 65° C. or higher, and particularly preferably 80° C. or higher. The heating temperature is more preferably 135° C. or lower, still more preferably 130° C. or lower, and particularly preferably 121° C. or lower.

In the conventional art that has been investigated in the present inventors, a hydrophilic polymer having a hydroxy group can be immobilized on the surface of a substrate at pH in a range from 2.0 to 6.0 in a condition requiring pressure at higher temperature, 100° C. or higher (see, for example, WO2017/146102).

However, as a result of study, the present inventors have found that, according to the method of the present invention, a hydrophilic polymer layer can be fixed on the surface of a device by using a normal salt and a hydrophilic polymer in combination in a broad pH range from 2.0 to 7.5 regardless of whether or not the hydrophilic polymer has a hydroxy group.

The reason for this is unclear, but is presumed to be because the normal salt promotes the aggregation of the hydrophilic polymer in the solution, thereby enhancing the intermolecular force, such as hydrogen bond, between the hydrophilic polymer and the device, and allowing the hydrophilic polymer layer to be fixed on the device surface.

In the manufacturing method of the present invention, the heating time is preferably from 5 minutes to 600 minutes. When the heating time is 5 minutes or more, a hydrophilic polymer layer exhibiting satisfactory water wettability and durability is more likely to be obtained. When the heating time is 600 minutes or less, it is less likely to exert an influence on the strength of the medical device itself. The heating time is more preferably 10 minutes or more, and still more preferably 15 minutes or more. The heating time is more preferably 400 minutes or less, and still more preferably 300 minutes or less.

After the above heat treatment, the medical device thus obtained may be further subjected to other treatments. Examples of the other treatments include treatments such as by a method in which a similar heat treatment is performed in a solution containing a hydrophilic polymer; a method in which a similar heat treatment is performed after changing the solution to a solution not containing a hydrophilic polymer; a method in which radiation is performed; a method in which a Layer-by-Layer treatment (LbL treatment) is performed for coating polymer materials having opposite charges alternately layer by layer; a method in which a crosslinking treatment with metal ions is performed; and a method in which a chemical crosslinking treatment is performed.

Before the above heat treatment, the substrate may be subjected to a pretreatment. Examples of the pretreatment include a hydrolysis treatment with an acid such as polyacrylic acid, or an alkali such as sodium hydroxide.

However, in light of the idea of the present invention which enables hydrophilization of a substrate surface by a simple method, a treatment is preferably performed without making the manufacturing process too complicated.

Radiations used for the above radiation are preferably various ion beams, electron beams, positron beams, X-rays, y rays, and neutron rays, more preferably electron beams and y rays, and most preferably y rays.

As the above LbL treatment, for example, a treatment using an acidic polymer and a basic polymer as disclosed in WO2013/024800 is preferably used.

As metal ions used in the above crosslinking treatment with metal ions, various metal ions can be preferably used, more preferably monovalent and divalent metal ions, and most preferably divalent metal ions. Alternatively, a chelate complex may be used.

As the above chemical crosslinking treatment, for example, a reaction between an epoxy group and a carboxy group, or a crosslinking treatment formed between an epoxy group and a known acidic hydrophilic polymer having a hydroxy group, as disclosed in Japanese Translated PCT Patent Application Laid-open No. 2014-533381 is preferably used.

In the above method in which a similar heat treatment is performed after changing the solution to a solution not containing a hydrophilic polymer, the solution not containing a hydrophilic polymer is not particularly limited and is preferably a buffering agent solution. The above-mentioned substances can be used as the buffering agent.

The pH of the buffering agent solution is preferably within a physiologically acceptable range of 6.3 to 7.8. The pH of the buffering agent solution is preferably 6.5 or higher, and still more preferably 6.8 or higher. The pH of the buffering agent solution is preferably 7.6 or lower, and more preferably 7.4 or lower.

The medical device in embodiments of the present invention has a hydrophilic polymer layer on at least a portion of the substrate. The phrase "having a hydrophilic polymer layer on at least a portion of the substrate" may mean, for example, depending on the application of the medical device, that the hydrophilic polymer layer exists on the entire surface of one of the substrate surfaces. In the case of a two-dimensional shape in which the substrate has no or, if any, negligible thickness, the polymer layer preferably exists on the entire surface of one of the two substrate surfaces. More preferably, the polymer layer exits on all the surfaces of the substrate.

Since the hydrophilic polymer can be produced by a simple process regardless of substrate, it is preferred that a covalent bond does not exist between the hydrophilic polymer layer and the substrate. The absence of a covalent bond is determined by the absence of chemically reactive group, or a group generated by a reaction thereof. Specific examples of the chemically reactive group include, but are not limited to, an azetidinium group, an epoxy group, an isocyanate group, an aziridine group, an azlactone group, and combinations thereof.

The thickness of the hydrophilic polymer layer is 1 nm or more and less than 100 nm, when observing a vertical cross section of the medical device in a dry state using a transmission electron microscope. When the thickness is in the above range, functions such as water wettability are likely to be exhibited. The thickness is more preferably 5 nm or more, and still more preferably 10 nm or more. The thickness is more preferably 95 nm or less, still more preferably 90 nm or less, still more preferably 85 nm or less, still more preferably 50 nm or less, still more preferably 30 nm or less, still more preferably 20 nm or less, still more preferably 15 nm or less, and particularly preferably 10 nm or less. When the thickness of the hydrophilic polymer layer is less than 100 nm, the hydrophilic polymer layer is excellent in water wettability and durability. For example, when the hydrophilic polymer layer is used in a medical device such as an ophthalmic lens, refraction of light for focusing on the retina is not disturbed and poor visibility is less likely to occur.

In the medical device, at least a portion of the hydrophilic polymer layer preferably exists in a mixed state with the substrate. The state where the hydrophilic polymer layer is mixed with the substrate is determined by detecting elements derived from the substrate in at least a portion of the cross-sectional structure of the substrate before and after the formation of the hydrophilic polymer layer and the hydrophilic polymer layer when a cross section of the medical device is observed using observation means capable of performing elemental analysis or composition analysis, such as scanning transmission electron microscopy, electron energy-loss spectroscopy, energy dispersive X-ray spectroscopy, or time-of-flight secondary ion mass spectrometry. By mixing the hydrophilic polymer layer with the substrate, the hydrophilic polymer layer can be firmly fixed to the substrate.

When at least a portion of the hydrophilic polymer layer exists in a mixed state with the substrate, it is preferable that a two-layer structure of a "layer in which at least a portion of the hydrophilic polymer layer is mixed with the substrate" (hereinafter referred to as a "mixed layer") and a "layer made of the hydrophilic polymer" (hereinafter referred to as a "single layer") is observed. The thickness of the mixed layer is preferably 3% or more, more preferably 5% or more, and still more preferably 10% or more, based on the total thickness of the mixed layer and the single layer. The thickness of the mixed layer is preferably 98% or less, more preferably 95% or less, still more preferably 90% or less, and particularly preferably 80% or less, based on the total thickness of the mixed layer and the single layer. Preferably, the percentage of the thickness of the mixed layer is 3% or more as described above, because the hydrophilic polymer and the substrate can be sufficiently mixed and the hydrophilic polymer can be more firmly fixed to the substrate. Preferably, the percentage of the thickness of the mixed layer is 98% or less, because the hydrophilicity of the hydrophilic polymer is likely to be sufficiently exhibited.

When the medical device is, for example, a medical device which is used by being attached to a surface of a living body or an ophthalmic device such as an ophthalmic lens, the liquid film retention time on the surface of the medical device is preferably longer from the viewpoints of preventing sticking to the skin of users and preventing sticking to the cornea of wearers. In other words, longer liquid film retention time means higher durability of the hydrophilicity of the medical device.

Specifically, the liquid film retention time of the medical device is preferably 10 seconds or more. The liquid film retention time is more preferably 15 seconds or more, and still more preferably 20 seconds or more. The upper limit of the range of the liquid film retention time is not particularly limited, and preferably 300 seconds or less, and more preferably 200 seconds or less, because too long liquid film retention time results in accelerated water evaporation from the surface of the medical device and decreased effect of the hydrophilic polymer layer.

Here, the liquid film retention time in the present invention refers to the time period during which a liquid film on the surface of the medical device is retained when the medical device is immersed and left in a phosphate buffer solution, then pulled up from the phosphate buffer solution, and held in the air. Specifically, the liquid film retention time is the time period from the time point when the medical device is immersed and left to stand in a phosphate buffer solution, then pulled up from the liquid, and kept in the air so that the surface is vertical, until the liquid film of the phosphate buffer solution covering the surface of the medical device is broken. The phrase "liquid film is broken" refers to a state where the liquid film on the surface of the medical device can no longer keep its shape, leading to a phenomenon that the phosphate buffer solution is repelled by a portion of the surface, so that the surface of the medical device is no longer completely covered by the liquid film.

In the conventional art, even a medical device with good water wettability has had a tendency that the water wettability is extremely deteriorated when subjected to high-pressure steam sterilization in a phosphate buffer solution not containing a hydrophilic polymer. That is, deterioration of the water wettability has been observed that is possibly caused by high-pressure steam sterilization making a hydrophilic polymer on the surface of a substrate peeled off or eluted. A medical device whose wettability deteriorates when subjected to high-pressure steam sterilization is not preferable because there is a risk that the surface state changes due to external stimulus, resulting in deterioration of the wettability. To the contrary, a medical device whose surface water wettability does not deteriorate even after being subjected to high-pressure steam sterilization can be said to be an excellent medical device whose surface state is hardly changed by external stimulus.

When the medical device is an ophthalmic device such as an ophthalmic lens, the liquid film retention time on the surface of the medical device after being subjected to high-pressure steam sterilization is preferably longer from the viewpoint that the medical device is less likely to impart feeling of dryness, allowing for maintaining satisfactory comfort for a long time. Specifically, the liquid film retention time on the surface of the medical device is evaluated after heating the medical device using an autoclave at 121° C. for 30 minutes in a phosphate buffer solution not containing a hydrophilic polymer. When the liquid film retention time on the surface of the medical device after high-pressure steam sterilization is 10 seconds or more, it means that the surface of the medical device has sufficient water wettability and durability. The liquid film retention time is preferably 10 seconds or more, more preferably 15 seconds or more, and particularly preferably 20 seconds or more. Particularly preferably, the liquid film retention time is equivalent to that before high-pressure steam sterilization because more excellent durability is exhibited. Details of the measurement method will be described later.

The tensile elastic modulus of the medical device should be appropriately selected according to the type of the medical device. In the case of a soft medical device such as an ophthalmic lens, the tensile elastic modulus is preferably 10 MPa or less, preferably 5 MPa or less, more preferably 3 MPa or less, still more preferably 2 MPa or less, yet more preferably 1 MPa or less, and most preferably 0.6 MPa or less. The tensile elastic modulus is preferably 0.01 MPa or more, more preferably 0.1 MPa or more, still more preferably 0.2 MPa or more, and most preferably 0.25 MPa or more. In the case of a soft medical device such as an ophthalmic lens, too small tensile elastic modulus is likely to lead to difficulty in handling because of being excessive in softness. Too large tensile elastic modulus is likely to lead to deterioration of comfort because of being excessive in hardness.

The percent change in the tensile elastic modulus of the substrate between before and after the heat treatment is preferably 15% or less, more preferably 14% or less, and particularly preferably 13% or less. Too large percent change in the tensile elastic modulus may lead to deformation and poor tactile sensation and thus is preferable. Details of the measurement method will be described later.

The antifouling properties of the medical device can be evaluated by deposition of lipid (methyl palmitate). The smaller the deposition amount by the evaluation, the more tactile sensation is excellent and bacterial propagation risk is reduced, which is preferable. Details of the measurement method will be described later.

In the method of manufacturing a medical device of the present invention, the percent change in the moisture content between the medical device obtained after completion of the heating step and the substrate before the heating step is preferably 10 percentage points or less. Here, the percent change in the moisture content (percentage point) means a difference between the moisture content (% by mass) of the resulting medical device and the moisture content (% by mass) of the substrate as a raw material of the medical device.

The percent change in the moisture content of the substrate before and after heating, for example, when the substrate is used in an ophthalmic device such as an ophthalmic lens, is preferably 10 percentage points or less, more preferably 8 percentage points or less, and particularly preferably 6 percentage points or less, from the viewpoint of preventing poor visibility and deformation caused by distortion of the refractive index due to the increase in moisture content. Details of the measurement method will be described later.

The percent change in the size of the substrate between before and after heating, for example, when the substrate is used in an ophthalmic device such as an ophthalmic lens, is preferably 5% or less, more preferably 4 or less, and particularly preferably 3% or less, from the viewpoint of preventing corneal injury caused by deformation. Details of the measurement method will be described later.

EXAMPLES

The present invention will be described more specifically by way of Examples, but the present invention is not limited to these Examples. First, analytical methods and evaluation methods will be shown. The liquid film retention time shown below is an index representing the durability of the hydrophilicity of the medical device.

<Water Wettability (Liquid Film Retention Time)>

The medical device obtained in Example was pulled up from the solution after heat treatment and held in the air such that the surface is vertical. The time period during which the liquid film on the surface was retained was visually observed, and an average of N=3 was evaluated according to the following criteria. Here, the time period during which the liquid film is retained means the time period from the time point at which the medical device is held vertically in the air until the liquid film of the phosphate buffer solution covering the surface of the medical device.

A: The liquid film on the surface was retained for 20 seconds or more.
B: The liquid film on the surface disappeared after 15 seconds or more and less than 20 seconds.
C: The liquid film on the surface disappeared after 10 seconds or more and less than 15 seconds.
D: The liquid film on the surface disappeared after 1 second or more and less than 10 seconds.
E: The liquid film on the surface instantly disappeared (less than 1 second).

<Water Wettability after Sterilization (Liquid Film Retention Time)>

The medical device obtained in Example was washed in 5 mL of a phosphate buffer solution at room temperature, immersed in 3 mL of a fresh phosphate buffer solution, heated using an autoclave at 121° C. for 30 minutes, and then sterilized. Thereafter, the medical device was pulled up from the phosphate buffer solution and held in the air such that the surface is vertical. The time period during which the liquid film on the surface was retained was visually observed, and the average of N=3 was evaluated according to the following criteria;

A: The liquid film on the surface was retained for 20 seconds or more.
B: The liquid film on the surface disappeared after 15 seconds or more and less than 20 seconds.
C: The liquid film on the surface disappeared after 10 seconds or more and less than 15 seconds.
D: The liquid film on the surface disappeared after 1 second or more and less than 10 seconds.
E: The liquid film on the surface instantly disappeared (less than 1 second).

<Moisture Content of Substrate and Medical Device>

A substrate was immersed in a phosphate buffer solution and left to stand at room temperature for 24 hours or more. The substrate was pulled out from the phosphate buffer solution and, after wiping off the surface moisture with a wiping cloth ("Kimwipes" (registered trademark) manufactured by NIPPON PAPER CRECIA CO., LTD.), the mass ($Ww$) of the substrate was measured. Thereafter, the substrate was dried at 40° C. for 2 hours in a vacuum dryer and the mass ($Wd$) was measured. From the mass, the moisture content of the substrate was calculated according to the following formula (1). The case where the obtained value was less than 1% was determined as below the measurement limit, and the column in the table was filled with "less than 1%". The average value of N=3 was regarded as the moisture content. The substrate after heating, or the medical device, was also pulled out from the solution and, after wiping off the surface moisture with a wiping cloth ("Kimwipes" (registered trademark) manufactured by NIPPON PAPER CRECIA CO., LTD.), the moisture content was similarly measured.

$$\text{Moisture content (\%) of substrate} = 100 \times (Ww - Wd)/Ww \quad \text{Formula (1)}$$

<Percent Change in Moisture Content of Substrate Before and After Heating>

From the measurement results of the moisture content of the substrate and the medical device described above, the percent change in the moisture content was calculated according to the following formula (2):

Percent change in moisture content (percentage point) of substrate between before and after heating=moisture content (% by mass) of medical device−moisture content (% by mass) of substrate     Formula (2)

<Lipid Deposition Amount>

In a 20-cc screw tube, 0.03 g of methyl palmitate, 10 g of pure water, and one sample of a medical device in a shape of contact lens were placed. The screw tube was shaken for 3 hours under the conditions at 37° C. and 165 rpm. After shaking, the sample in the screw tube was scrubbed with tap water at 40° C. and a household liquid detergent ("Mama Lemon (registered trademark)" manufactured by Lion Corporation). The washed sample was placed in a screw tube containing a phosphate buffer solution and stored in a refrigerator at 4° C. for 1 hour. Thereafter, the sample was visually observed, and if the turbid portion existed, it was judged that methyl palmitate was deposited and the area of the portion in which methyl palmitate was deposited to the entire surface of the sample was observed.

<Tensile Elastic Modulus>

A test piece having a width (minimum portion) of 5 mm and a length of 14 mm was cut out from a substrate having a contact lens or sheet shape using a prescribed punching die. Using the test piece, a tensile test was performed using Tensilon Model RTG-1210 manufactured by A&D Company, Limited. The pulling rate was 100 mm/min and the distance between grips (initial) was 5 mm. Measurements were made on both the substrate before heat treatment and the medical device after heat treatment. Measurements were made with N=8 and the average of N=6 excluding the maximum value and the minimum value was regarded as the tensile elastic modulus.

<Percent Change in Tensile Elastic Modulus of Substrate Before and After Heating>

From the measurement results of the tensile elastic modulus of the substrate and the medical device described above, the percent change in the tensile elastic modulus between before and after heat treatment was calculated according to the following formula (3):

Percent change (%) in tensile elastic modulus of substrate between before and after heat treatment=(Tensile elastic modulus of medical device after heat treatment−Tensile elastic modulus of substrate before heat treatment)/Tensile elastic modulus substrate before heat treatment×100     Formula (3)

<Size>

The diameters of a substrate having a contact lens or sheet shape (N=3) were measured and the average was regarded as the size. The size of the substrate after heat treatment, i.e., the medical device was also measured in the same manner.

<Percent Change in Size Before and After Heating>

From the measurement results of the size of the substrate and the medical device described above, the percent change in the size between before and after heat treatment was calculated according to the following formula (4):

Percent change (%) in size between before and after heat treatment=(Size of device after heat treatment−Size of substrate before heat treatment)/Size of substrate before heat treatment×100     Formula (4)

<Molecular Weight Measurement>

The molecular weight of a hydrophilic polymer was measured under the following conditions.

Apparatus: Prominence GPC system manufactured by Shimadzu Corporation
Pump: LC-20AD
Autosampler: SIL-20AHT
Column oven: CTO-20A
Detector: RID-10A
Column: GMPWXL manufactured by Tosoh Corporation (7.8 mm in inner diameter×30 cm, particle diameter of 13 μm)
Solvent: water/methanol=1/1 (0.1 N lithium nitrate was added) Flow rate: 0.5 mL/minute
Measurement time: 30 minutes
Sample concentration: 0.1 to 0.3% by mass
Sample injection amount: 100 μL
Standard sample: Polyethylene oxide standard sample manufactured by Agilent Technologies, Inc. (0.1 kD to 1258 kD)

<pH Measurement Method>

The pH of the solution was measured using a pH meter, Eutech pH 2700 (manufactured by Eutech Instruments Pte Ltd). In the table, the pH before heat treatment of a solution containing a hydrophilic polymer and a normal salt was determined by adding all the hydrophilic polymer and the normal salt to the solution mentioned in each Example and Comparative Example, followed by stirring at room temperature (20 to 23° C.) for 30 minutes with a rotor to thereby make the solution uniform. In the table, "pH after heat treatment" is the pH measured immediately after the solution was cooled to room temperature (20 to 23° C.) after a heat treatment was performed once.

<Thickness of Hydrophilic Polymer Layer>

The thickness of a hydrophilic polymer layer was measured by observing a cross section of a medical device in a dry state using a transmission electron microscope. With changing the place three times, the thickness was measured once for each field of view, and the average of the thicknesses at three places was mentioned.

Apparatus: Transmission electron microscope
Condition: Accelerating voltage of 100 kV
Sample preparation: Sample was prepared by ultrathin sectioning using $RuO_4$ staining.

When it is difficult to discriminate between a substrate and a hydrophilic polymer layer, the sample may be stained with $OsO_4$. In this Example, when the substrate is a silicone hydrogel-based or silicone-based substrate, the sample was stained with $RuO_4$. An ultramicrotome was used to prepare an ultrathin section.

Manufacturing Example 1

After preparing 28 parts by mass of a polydimethylsiloxane having a methacryloyl group at both ends represented by the formula (M1) (FM 7726, JNC Corporation, Mw: 30,000), 7 parts by mass of a silicone monomer represented by the formula (M2) (FM 0721, JNC Corporation, Mw: 5,000), 57.9 parts by mass of trifluoroethyl acrylate ("Viscoat" (registered trademark) 3F, Osaka Organic Chemical Industry Ltd.), 7 parts by mass of 2-ethylhexyl acrylate (Tokyo Chemical Industry Co., Ltd.), and 0.1 parts by mass of dimethylaminoethyl acrylate (Kohjin Co., Ltd.), preparing 5,000 ppm of a photoinitiator "IRGACURE" (registered trademark) 819 (NAGASE & CO., LTD.), 5,000 ppm of a UV absorber (RUVA-93, Otsuka Chemical Co. Ltd.), and 100 ppm of a colorant (RB 246, Arran chemical) based on the total amount of these monomers, and preparing 10 parts by mass of t-amyl alcohol based on 100 parts by mass of the total amount of these monomers, all components were mixed with stirring. The stirred mixture was filtered through a membrane filter (pore diameter: 0.45 μm) to remove insoluble substances to obtain a monomer mixture.

The above monomer mixture was poured into a contact lens mold made of a transparent resin (material on base curve side: polypropylene, material on front curve side: polypropylene) and then polymerized by irradiation with light (wavelength 405 nm (±5 nm), illuminance: 0 to 0.7 mW/cm$^2$, for 30 minutes) to obtain a molded body made of a low water content soft material having a silicon atom.

After the polymerization, the molded body thus obtained was immersed in an aqueous solution of 100% by mass isopropyl alcohol at 60° C. for 1.5 hours together with the mold from which a front curve and a base curve were released, and then a molded body having a contact lens shape was removed from the mold. The molded body thus obtained was immersed in a large excess amount of an aqueous solution of 100% by mass isopropyl alcohol maintained at 60° C. for 2 hours to extract impurities such as residual monomers. Thereafter, the molded body was dried at room temperature (23° C.) for 12 hours.

[Formula 1]

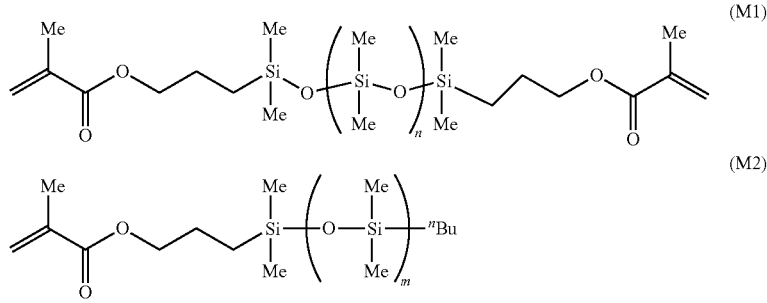

<Phosphate Buffer Solution>

The compositions of the phosphate buffer solutions used in the processes of the following Examples and Comparative Examples and the above-mentioned measurements are as follows. In the composition described below, EDTA2Na represents disodium dihydrogen ethylenediaminetetraacetate.

KCl: 0.2 g/L
KH$_2$PO$_4$: 0.2 g/L
NaCl: 8.0 g/L
Na$_2$HPO$_4$: 1.19 g/L
EDTA2Na: 0.5 g/L

Example 1

A commercially available silicone hydrogel lens containing silicone as a main component "MyDay (registered trademark)" (stenfilcon A, manufactured by CooperVision Inc.) was used as a substrate. The substrate was immersed in a phosphate buffer solution containing 0.03% by mass of an acrylic acid/N,N-diethylacrylamide copolymer (molar ratio in copolymerization: 1/9, Mw: 800,000, manufactured by Osaka Organic Chemical Industry Ltd.) as a hydrophilic polymer, and 1.0% by mass of NaCl as a normal salt, followed by heat treatment in an autoclave at 121° C. for 30 minutes. The results obtained by evaluation of the obtained medical device using the above method are shown in Tables 1 to 3.

Example 2

A commercially available silicone hydrogel lens containing silicone as a main component "MyDay (registered trademark)" (stenfilcon A, manufactured by CooperVision Inc.) was used as a substrate. The substrate was immersed in a phosphate buffer solution containing 0.05% by mass of an acrylic acid/acryloylmorpholine copolymer (molar ratio in copolymerization: 1/9, Mw: 320,000, manufactured by Osaka Organic Chemical Industry Ltd.) as a hydrophilic polymer, and 10% by mass of KCl as a normal salt, followed by heat treatment in an autoclave at 121° C. for 30 minutes. The results obtained by evaluation of the obtained medical device using the above method are shown in Tables 1 to 3.

Example 3

A commercially available silicone hydrogel lens containing silicone as a main component "MyDay (registered trademark)" (stenfilcon A, manufactured by CooperVision Inc.) was used as a substrate. The substrate was immersed in a phosphate buffer solution containing 0.04% by mass of an acrylic acid/N,N-dimethylacrylamide/N,N-diethylacrylamide copolymer (molar ratio in copolymerization: 1/8/1, Mw: 630,000, manufactured by Osaka Organic Chemical Industry Ltd.) as a hydrophilic polymer, and 5% by mass of NaCl as a normal salt, with the pH adjusted to 3.0 with addition of citric, followed by heat treatment in an autoclave at 90° C. for 30 minutes. The results obtained by evaluation of the obtained medical device using the above method are shown in Tables 1 to 3.

Example 4

A commercially available silicone hydrogel lens containing silicone as a main component "MyDay (registered trademark)" (stenfilcon A, manufactured by CooperVision Inc.) was used as a substrate. The substrate was immersed in a phosphate buffer solution containing 0.05% by mass of an acrylic acid/N-vinylpyrrolidone/N,N-dimethyl acrylamide copolymer (molar ratio in copolymerization: 1/1/2, Mw: 330,000, manufactured by Osaka Organic Chemical Industry Ltd.) as a hydrophilic polymer, and 3% by mass of NaCl as a normal salt, followed by heat treatment in an autoclave at 100° C. for 30 minutes. The results obtained by evaluation of the obtained medical device using the above method are shown in Tables 1 to 3.

Example 5

A commercially available silicone hydrogel lens containing silicone as a main component "Acuvue Oasys (registered trademark)" (senofilcon A, manufactured by Johnson & Johnson) was used as a substrate. The substrate was immersed in a phosphate buffer solution containing 0.03% by mass of an acrylic acid/N-vinylpyrrolidone copolymer (molar ratio in copolymerization: 1/9. Mw: 390,000, manufactured by Osaka Organic Chemical Industry Ltd.) as a hydrophilic polymer, and 10% by mass of NaCl as a normal salt, followed by heat treatment in an autoclave at 121° C. for 30 minutes. The results obtained by evaluation of the obtained medical device using the above method are shown in Tables 1 to 3.

Example 6

A commercially available silicone hydrogel lens containing silicone as a main component "Acuvue Oasys (registered trademark)" (senofilcon A, manufactured by Johnson & Johnson) was used as a substrate. The substrate was immersed in a phosphate buffer solution containing 0.03% by mass of an acrylic acid/2-hydroxyethyl methacrylate/N,N-dimethyl acrylamide copolymer (molar ratio in copolymerization: 1/1/8, Mw: 480,000, manufactured by Osaka Organic Chemical Industry Ltd.) as a hydrophilic polymer, and 10% by mass of KCl as a normal salt, with the pH adjusted to 2.5 with addition of citric, followed by heat treatment in an autoclave at 90° C. for 30 minutes. The results obtained by evaluation of the obtained medical device using the above method are shown in Tables 1 to 3.

Example 7

A commercially available silicone hydrogel lens containing silicone as a main component "Acuvue Oasys (registered trademark)" (senofilcon A, manufactured by Johnson & Johnson) was used as a substrate. The substrate was immersed in a phosphate buffer solution containing 0.03% by mass of polyvinylpyrrolidone (Mw: 200,000, manufactured by Osaka Organic Chemical Industry Ltd.) as a hydrophilic polymer, and 10% by mass of NaCl as a normal salt, followed by heat treatment in an autoclave at 121° C. for 30 minutes. The results obtained by evaluation of the obtained medical device using the above method are shown in Tables 1 to 3.

Example 8

A commercially available silicone hydrogel lens containing silicone as a main component "Acuvue Oasys (registered trademark)" (senofilcon A, manufactured by Johnson & Johnson) was used as a substrate. The substrate was immersed in a phosphate buffer solution containing 0.03% by mass of poly(dimethyl acrylamide) (Mw: 200,000, manufactured by Osaka Organic Chemical Industry Ltd.) as a hydrophilic polymer, and 10% by mass of NaCl as a normal salt, followed by heat treatment in an autoclave at 121° C. for 30 minutes. The results obtained by evaluation of the obtained medical device using the above method are shown in Tables 1 to 3.

Example 9

The molded body obtained in Manufacturing Example 1 was used as a substrate. The substrate was immersed in a phosphate buffer solution containing 0.05% by mass of an acrylic acid/N,N-diethylacrylamide copolymer (molar ratio in copolymerization: 1/9, Mw: 280,000, manufactured by Osaka Organic Chemical Industry Ltd.) as a hydrophilic polymer, and 10% by mass of NaCl as a normal salt, followed by heat treatment in an autoclave at 121° C. for 30 minutes. The results obtained by evaluation of the obtained medical device using the above method are shown in Tables 1 to 3.

Example 10

The molded body obtained in Manufacturing Example 1 was used as a substrate. The substrate was immersed in a phosphate buffer solution containing 0.05% by mass of poly(N,N-diethylacrylamide) (Mw: 290,000, manufactured by Osaka Organic Chemical Industry Ltd.) as a hydrophilic polymer, and 12% by mass of KCl as a normal salt, followed by heat treatment in an autoclave at 121° C. for 30 minutes. The results obtained by evaluation of the obtained medical device using the above method are shown in Tables 1 to 3.

Example 11

A commercially available silicone hydrogel lens containing silicone as a main component "MyDay (registered trademark)" (stenfilcon A, manufactured by CooperVision Inc.) was used as a substrate. The substrate was immersed in a phosphate buffer solution containing 0.03% by mass of an acrylic acid/N,N-diethylacrylamide copolymer (molar ratio in copolymerization: 1/9, Mw: 800,000, manufactured by Osaka Organic Chemical Industry Ltd.) as a hydrophilic polymer, and 0.18% by mass of NaCl as a normal salt, followed by heat treatment in an autoclave at 121° C. for 30 minutes. The results obtained by evaluation of the obtained medical device using the above method are shown in Tables 1 to 3.

Example 12

A commercially available silicone hydrogel lens containing silicone as a main component "Acuvue Oasys (registered trademark)" (senofilcon A, manufactured by Johnson & Johnson) was used as a substrate. The substrate was immersed in a phosphate buffer solution containing 0.03% by mass of poly(dimethyl acrylamide) (Mw: 200,000, manufactured by Osaka Organic Chemical Industry Ltd.) as a hydrophilic polymer, and 5% by mass of NaCl as a normal salt, followed by heat treatment in an autoclave at 121° C. for 30 minutes. The results obtained by evaluation of the obtained medical device using the above method are shown in Tables 1 to 3.

TABLE 1

|  | Substrate | Moisture content of substrate % by mass | Hydrophilic polymer and concentration thereof in solution | Normal salt concentration in solution (% by mass) | pH before heat treatment | pH after heat treatment |
| --- | --- | --- | --- | --- | --- | --- |
| Example 1 | "MyDay ®" | 54.0 | 0.03% by mass of acrylic acid/ N,N-diethylacrylamide copolymer | 1.82 | 6.7 | 6.8 |

TABLE 1-continued

| | Substrate | Moisture content of substrate % by mass | Hydrophilic polymer and concentration thereof in solution | Normal salt concentration in solution (% by mass) | pH before heat treatment | pH after heat treatment |
|---|---|---|---|---|---|---|
| Example 2 | "MyDay ®" | 54.0 | 0.05% by mass of acrylic acid/ acryloylmorpholine copolymer | 10.82 | 6.4 | 6.5 |
| Example 3 | "MyDay ®" | 54.0 | 0.04% by mass of acrylic acid/ N,N-dimethylacrylamide/ N,N-diethylacrylamide copolymer | 5.82 | 3.0 | 3.1 |
| Example 4 | "MyDay ®" | 54.0 | 0.05% by mass of acrylic acid/ N-vinylpyrrolidone/N,N-dimethylacrylamide copolymer | 3.82 | 6.3 | 6.4 |
| Example 5 | "Acuvue Oasys" | 38.0 | 0.03% by mass acrylic acid/ N-vinvipyrrolidone copolymer | 10.82 | 6.4 | 6.5 |
| Example 6 | "Acuvue Oasys" | 38.0 | 0.03% by mass of acrylic acid/ 2-hydroxyethyl methacrylate/ N,N-dimethylacrylamide copolymer | 5.82 | 2.5 | 2.6 |
| Example 7 | "Acuvue Oasys" | 38.0 | 0.03% by mass of polyvinylpyrrolidone | 10.82 | 6.5 | 6.6 |
| Example 8 | "Acuvue Oasys" | 38.0 | 0.03% by mass of polydimethylacrylamide | 10.82 | 6.5 | 6.6 |
| Example 9 | Manufacturing Example 1 | <1 | 0.05% by mass of acrylic acid/ N,N-diethylacrylamide copolymer | 10.82 | 6.6 | 6.7 |
| Example 10 | Manufacturing Example 1 | <1 | 0.05% by mass of poly(N,N-diethylacrylamide) | 12.82 | 6.5 | 6.6 |
| Example 11 | "MyDay ®" | 54.0 | 0.03% by mass of acrylic acid/ N,N-diethylacrylamide copolymer | 1.00 | 6.7 | 6.8 |
| Example 12 | "Acuvue Oasys" | 380 | 0.03% by mass polydimethylacrylamide | 5.82 | 6.7 | 6.8 |

TABLE 2

| | Liquid film retention time (sec) | Liquid film retention time after sterilization (sec) | Moisture content of medical device (% by mass) | Thickness of hydrophilic polymer layer (nm) | Change in moisture content (percentage point) |
|---|---|---|---|---|---|
| Example 1 | A (120 sec) | A (120 sec) | 54.1 | 5 | 0.1 |
| Example 2 | A (120 sec) | A (120 sec) | 54.1 | 6 | 0.1 |
| Example 3 | A (30 sec) | A (30 sec) | 54.1 | 5 | 0.1 |
| Example 4 | A (120 sec) | A (120 sec) | 54.1 | 5 | 0.1 |
| Example 5 | A (120 sec) | A (120 sec) | 38.1 | 5 | 0.1 |
| Example 6 | A (30 sec) | A (30 sec) | 38.0 | 6 | 0 |
| Example 7 | A (120 sec) | A (120 sec) | 38.1 | 7 | 0.1 |
| Example 8 | A (120 sec) | A (120 sec) | 38.1 | 5 | 0.1 |
| Example 9 | A (30 sec) | A (30 see) | 1.2 | 5 | 0.2 |
| Example 10 | A (30 sec) | A (30 sec) | 1.3 | 6 | 0.3 |
| Example 11 | A (120 sec) | A (120 sec) | 54.0 | 5 | 0 |
| Example 12 | A (120 sec) | A (120 sec) | 38.0 | 5 | 0 |

TABLE 3

| | Lipid deposition amount | Tensile elastic modulus of substrate (MPa) | Tensile elastic modulus of medical device (MPa) | Percent change in tensile elastic modulus (%) | Size of substrate (mm) | Size of medical device (mm) | Percent change in size (%) |
|---|---|---|---|---|---|---|---|
| Example 1 | No deposition | 0.61 | 0.61 | 0.1 | 14.20 | 14.21 | 0.10 |
| Example 2 | No deposition | 0.61 | 0.60 | −0.9 | 14.20 | 14.22 | 0.14 |
| Example 3 | No deposition | 0.61 | 0.61 | 0.2 | 14.20 | 14.19 | −0.10 |
| Example 4 | No deposition | 0.61 | 0.61 | 0.1 | 14.20 | 14.19 | −0.10 |
| Example 5 | No deposition | 0.70 | 0.71 | 1.4 | 14.20 | 14.21 | 0.07 |
| Example 6 | No deposition | 0.70 | 0.71 | 1.4 | 14.20 | 14.21 | 0.07 |

TABLE 3-continued

|  | Lipid deposition amount | Tensile elastic modulus of substrate (MPa) | Tensile elastic modulus of medical device (MPa) | Percent change in tensile elastic modulus (%) | Size of substrate (mm) | Size of medical device (mm) | Percent change in size (%) |
|---|---|---|---|---|---|---|---|
| Example 7 | No deposition | 0.70 | 0.72 | 2.8 | 14.20 | 14.22 | 0.14 |
| Example 8 | No deposition | 0.70 | 0.72 | 2.8 | 14.20 | 14.21 | 0.07 |
| Example 9 | No deposition | 0.53 | 0.54 | 1.9 | 14.20 | 14.19 | −0.07 |
| Example 10 | No deposition | 0.53 | 0.54 | 1.9 | 14.20 | 14.19 | −0.07 |
| Example 11 | No deposition | 0.61 | 0.61 | 0.1 | 14.20 | 14.20 | 0 |
| Example 12 | No deposition | 0.70 | 0.71 | 1.4 | 14.20 | 14.21 | 0.07 |

Comparative Example 1

A commercially available silicone hydrogel lens containing silicone as a main component "MyDay (registered trademark)" (stenfilcon A, manufactured by CooperVision Inc.) was immersed in a phosphate buffer solution, followed by heat treatment at 121° C. for 30 minutes. The results obtained by evaluation of the obtained medical device (a hydrophilic polymer layer was not observed) using the above method are shown in Tables 4 to 6.

Comparative Example 2

A commercially available silicone hydrogel lens containing silicone as a main component "MyDay (registered trademark)" (stenfilcon A, manufactured by CooperVision Inc.) was used as a substrate. The substrate was immersed in a phosphate buffer solution containing 0.03% by mass of an acrylic acid/N,N-dimethylacrylamide copolymer (molar ratio in copolymerization: 1/9, Mw: 800,000, manufactured by Osaka Organic Chemical Industry Ltd.) as a hydrophilic polymer, followed by heat treatment in an autoclave at 121° C. for 30 minutes. The results obtained by evaluation of the obtained medical device (a hydrophilic polymer layer was not observed) using the above method are shown in Tables 4 to 6.

Comparative Example 3

A commercially available silicone hydrogel lens containing silicone as a main component "MyDay (registered trademark)" (stenfilcon A, manufactured by CooperVision Inc.) was used as a substrate. The substrate was immersed in a phosphate buffer solution containing 0.05% by mass of poly(dimethyl acrylamide) (Mw: 300,000, manufactured by Osaka Organic Chemical Industry Ltd.) as a hydrophilic polymer, followed by heat treatment in an autoclave at 80° C. for 30 minutes. The results obtained by evaluation of the obtained medical device (a hydrophilic polymer layer was not observed) using the above method are shown in Tables 4 to 6.

Comparative Example 4

A commercially available silicone hydrogel lens containing silicone as a main component "MyDay (registered trademark)" (stenfilcon A, manufactured by CooperVision Inc.) was used as a substrate. The substrate was immersed in a phosphate buffer solution containing 0.05% by mass of polyvinylpyrrolidone (Mw: 300,000, manufactured by Osaka Organic Chemical Industry Ltd.) as a hydrophilic polymer, with the pH adjusted to 3.0 using citric acid, followed by heat treatment in an autoclave at 121° C. for 30 minutes. The results obtained by evaluation of the obtained medical device (a hydrophilic polymer layer was not observed) using the above method are shown in Tables 4 to 6.

Comparative Example 5

A commercially available silicone hydrogel lens containing silicone as a main component "MyDay (registered trademark)" (stenfilcon A, manufactured by CooperVision Inc.) was used as a substrate. The substrate was immersed in a phosphate buffer solution containing 0.03% by mass of an acrylic acid/N-vinylpyrrolidone copolymer (molar ratio in copolymerization: 1/9, Mw: 500,000, manufactured by Osaka Organic Chemical Industry Ltd.) as a hydrophilic polymer, followed by sterilization in an autoclave at 121° C. for 30 minutes. The results obtained by evaluation of the obtained medical device (a hydrophilic polymer layer was not observed) using the above method are shown in Tables 4 to 6.

Comparative Example 6

A commercially available silicone hydrogel lens containing silicone as a main component "MyDay (registered trademark)" (stenfilcon A, manufactured by CooperVision Inc.) was used as a substrate. The substrate was immersed in a phosphate buffer solution containing 0.03% by mass of an acrylic acid/N-vinylpyrrolidone copolymer (molar ratio in copolymerization: 1/9. Mw: 320,000, manufactured by Osaka Organic Chemical Industry Ltd.) as a hydrophilic polymer, followed by heat treatment in an autoclave at 100° C. for 30 minutes. The results obtained by evaluation of the obtained medical device (a hydrophilic polymer layer was not observed) using the above method are shown in Tables 4 to 6.

Comparative Example 7

A commercially available silicone hydrogel lens containing polyvinylpyrrolidone and silicone as main components "Acuvue Oasys (registered trademark)" (senofilcon A, manufactured by Johnson & Johnson) was used as a substrate. The substrate was immersed in a phosphate buffer solution containing 0.2% by mass of an acrylic acid/vinylpyrrolidone/N,N-dimethyl acrylamide copolymer (molar ratio in copolymerization: 1/1/2, Mw: 550,000, manufactured by Osaka Organic Chemical Industry Ltd.) as a hydrophilic polymer, followed by heat treatment in an autoclave at 121° C. for 30 minutes. The results obtained by evaluation of the obtained medical device (a hydrophilic polymer layer was not observed) using the above method are shown in Tables 4 to 6.

Comparative Example 8

A commercially available silicone hydrogel lens containing polyvinylpyrrolidone and silicone as main components "Acuvue Oasys (registered trademark)" (senofilcon A, manufactured by Johnson & Johnson) was used as a substrate. The substrate was immersed in a phosphate buffer solution containing 0.05% by mass of poly(dimethyl acrylamide) (Mw: 300,000, manufactured by Osaka Organic Chemical Industry Ltd.) as a hydrophilic polymer, with the pH adjusted to 3.5 using citric acid, followed by heat treatment in an autoclave at 121° C. for 30 minutes. The results obtained by evaluation of the obtained medical device (a hydrophilic polymer layer was not observed) using the above method are shown in Tables 4 to 6.

Comparative Example 9

A commercially available silicone hydrogel lens containing polyvinylpyrrolidone and silicone as main components "Acuvue Oasys (registered trademark)" (senofilcon A, manufactured by Johnson & Johnson) as a substrate was immersed in a phosphate buffer solution, followed by heat treatment in an autoclave at 121° C. for 30 minutes. The results obtained by evaluation of the obtained medical device (a hydrophilic polymer layer was not observed) using the above method are shown in Tables 4 to 6.

Comparative Example 10

The molded body obtained in Manufacturing Example 1 as a substrate was immersed in a phosphate buffer solution, followed by heat treatment in an autoclave at 121° C. for 30 minutes. The results obtained by evaluation of the obtained medical device (a hydrophilic polymer layer was not observed) using the above method are shown in Tables 4 to 6.

Comparative Example 11

A commercially available silicone hydrogel lens containing silicone as a main component "Acuvue Oasys (registered trademark)" (senofilcon A, manufactured by Johnson & Johnson) was used as a substrate. The substrate was immersed in a phosphate buffer solution containing 0.03% by mass of an acrylic acid/2-hydroxyethyl methacrylate/N,N-dimethyl acrylamide copolymer (molar ratio in copolymerization: 1/1/8, Mw: 480,000, manufactured by Osaka Organic Chemical Industry Ltd.) as a hydrophilic polymer, and 0.1% by mass of KCl as a normal salt, with the pH adjusted to 2.5 with addition of citric, followed by heat treatment in an autoclave at 90° C. for 30 minutes. The results obtained by evaluation of the obtained medical device (a hydrophilic polymer layer was not observed) using the above method are shown in Tables 4 to 6.

Comparative Example 12

A commercially available silicone hydrogel lens containing silicone as a main component "MyDay (registered trademark)" (stenfilcon A, manufactured by CooperVision Inc.) was used as a substrate. The substrate was tried to be immersed in a phosphate buffer solution containing 0.05% by mass of an acrylic acid/acryloylmorpholine copolymer (molar ratio in copolymerization: 1/9, Mw: 320,000, manufactured by Osaka Organic Chemical Industry Ltd.) as a hydrophilic polymer, and 21% by mass of KCl as a normal salt. However, the buoyancy caused by too high specific gravity of the solution did not allow the substrate to be immersed in the solution, so that a medical device was not successfully prepared. The results obtained by evaluation using the above method are shown in Tables 4 to 6.

TABLE 4

| | Substrate | Moisture content of substrate (% by mass) | Hydrophilic polymer and concentration thereof in solution | Normal salt concentration in solution (% by mass) | pH before heat treatment | pH after heat treatment |
|---|---|---|---|---|---|---|
| Comparative Example 1 | "MyDay ®" | 54.0 | None | 0.82 | 7.0 | 7.2 |
| Comparative Example 2 | "MyDay ®" | 54.0 | 0.03% by mass of acrylic acid/N,N-dimethylacrylamide copolymer | 0.82 | 7.0 | 7.2 |
| Comparative Example 3 | "MyDay ®" | 54.0 | 0.05% by mass of polydimethylacrylamide | 0.82 | 7.0 | 7.1 |
| Comparative Example 4 | "MyDay ®" | 54.0 | 0.05% by mass of polyvinylpyrrolidone | 0.82 | 3.0 | 3.0 |
| Comparative Example 5 | "MyDay ®" | 54.0 | 0.03% by mass of acrylic acid/N-vinvlpyrrolidone copolymer | 0.82 | 7.0 | 7.2 |
| Comparative Example 6 | "MyDay ®" | 54.0 | 0.03% by mass of acrylic acid/N-vinylpyrrolidone copolymer | 0.82 | 7.0 | 7.1 |
| Comparative Example 7 | "Acuvue Oasys" | 38.0 | 0.2% by mass of acrylic acid/vinylpyrrolidone/N,N-dimethylacrylamide copolymer | 0.82 | 6.7 | 6.7 |
| Comparative Example 8 | "Acuvue Oasys" | 38.0 | 0.05% by mass of polydimethylacrylamide | 0.82 | 3.5 | 3.5 |
| Comparative Example 9 | "Acuvue Oasys" | 38.0 | None | 0.82 | 7.0 | 7.2 |
| Comparative Example 10 | Manufacturing Example 1 | <1 | None | 0.82 | 7.0 | 7.0 |
| Comparative Example 11 | "Acuvue Oasys" | 38.0 | 0.03% by mass of acrylic acid/2-Hydroxyethyl methacrylate/N,N-dimethylacrylamide copolymer | 0.92 | 2.5 | 2.6 |

TABLE 4-continued

|  | Substrate | Moisture content of substrate (% by mass) | Hydrophilic polymer and concentration thereof in solution | Normal salt concentration in solution (% by mass) | pH before heat treatment | pH after heat treatment |
|---|---|---|---|---|---|---|
| Comparative Example 12 | "MyDay ®" | 54.0 | 0.05% by mass of acrylic acid/ acryloylmorpholine copolymer | 21.82 | 6.4 | Unmeasurable |

TABLE 5

|  | Liquid film retention time (sec) | Liquid film retention time after sterilization (sec) | Moisture content of medical device (% by mass) | Thickness of hydrophilic polymer layer (nm) | Change in moisture content (percentage point) |
|---|---|---|---|---|---|
| Comparative Example 1 | D (3 sec) | D (1 sec) | 54.0 | 0 | 0 |
| Comparative Example 2 | D (1 sec) | D (1 sec) | 54.0 | 0 | 0 |
| Comparative Example 3 | D (1 sec) | D (1 sec) | 54.0 | 0 | 0 |
| Comparative Example 4 | D (1 sec) | D (1 sec) | 54.0 | 0 | 0 |
| Comparative Example 5 | D (4 sec) | D (1 sec) | 54.1 | 0 | 0.1 |
| Comparative Example 6 | D (4 sec) | D (1 sec) | 54.0 | 0 | 0 |
| Comparative Example 7 | D (1 sec) | D (1 sec) | 38.0 | 0 | 0 |
| Comparative Example 8 | D (1 sec) | D (1 sec) | 38.0 | 0 | 0 |
| Comparative Example 9 | D (1 sec) | D (1 sec) | 38.0 | 0 | 0 |
| Comparative Example 10 | E (less than 1 sec) | E (less than 1 sec) | <1 | 0 | 0 |
| Comparative Example 11 | D (1 sec) | D (1 sec) | 38.0 | 0 | 0 |
| Comparative Example 12 | Unmeasurable | | | | |

TABLE 6

|  | Lipid deposition amount | Tensile elastic modulus of substrate (MPa) | Tensile elastic modulus of medical device (MPa) | Percent change in tensile elastic modulus (%) | Size of substrate (mm) | Size of medical device (mm) | Percent change in size (%) |
|---|---|---|---|---|---|---|---|
| Comparative Example 1 | Deposition over 1/5 of entire area | 0.61 | Not measured | Not measured | 14.20 | Not measured | Not measured |
| Comparative Example 2 | Deposition over 1/5 of entire area | 0.61 | 0.60 | −1.1 | 14.20 | 14.19 | −0.07 |
| Comparative Example 3 | Deposition over 1/5 of entire area | 0.61 | 0.62 | 1.6 | 14.20 | 14.20 | 0 |
| Comparative Example 4 | Deposition over 1/5 of entire area | 0.61 | 0.61 | 0.3 | 14.20 | 14.19 | −0.07 |
| Comparative Example 5 | Ddeposition over 1/5 of entire area | 0.61 | 0.61 | 0.2 | 14.20 | 14.19 | −0.07 |
| Comparative Example 6 | Deposition over 1/5 of entire area | 0.61 | 0.61 | 0.1 | 14.20 | 14.20 | 0 |
| Comparative Example 7 | Deposition over 1/5 of entire area | 0.70 | 0.71 | 1.4 | 14.20 | 14.21 | 0.07 |

TABLE 6-continued

|  | Lipid deposition amount | Tensile elastic modulus of substrate (MPa) | Tensile elastic modulus of medical device (MPa) | Percent change in tensile elastic modulus (%) | Size of substrate (mm) | Size of medical device (mm) | Percent change in size (%) |
|---|---|---|---|---|---|---|---|
| Comparative Example 8 | Deposition over 1/5 of entire area | 0.71 | 0.70 | −1.3 | 14.20 | 14.20 | 0 |
| Comparative Example 9 | Deposition over 115 of entire area | 0.71 | 0.71 | 0 | 14.20 | 14.20 | 0 |
| Comparative Example 10 | Deposition over entire area | 0.53 | 0.53 | 0 | 14.20 | 14.20 | 0 |
| Comparative Example 11 | Deposition over 1/5 of entire area | 0.70 | 0.71 | 1.4 | 14.20 | 14.20 | 0 |
| Comparative Example 12 | Unmeasurable | 0.61 | Unmeasurable | Unmeasurable | 14.20 | Unmeasurable | Unmeasurable |

The invention claimed is:

1. A method of manufacturing a medical device comprising a substrate and a hydrophilic polymer layer, comprising the steps of:
   placing the substrate in a solution containing a hydrophilic polymer and a normal salt in an amount ranging from 3.0 to 20% by mass; and
   heating the solution at a temperature ranging from 50° C. to 140° C.,
   wherein the normal salt contains one or more selected from the group consisting of $BaSO_4$, $BaCO_3$, $CaSO_4$, $CaCO_3$, $(CH_3COO)_2Ca$, NaCl, $Na_2CO_3$, $Na_2SO_4$, $NaNO_3$, $CH_3COONa$, KCl, $K_2SO_4$, $K_2CO_3$, $KNO_3$, $CH_3COOK$, LiCl, $LiSO_4$, $LiCO_3$, $LiNO_3$, and $CH_3COOLi$, and
   wherein the hydrophilic polymer comprises an amide group and an acidic group.

2. The method of manufacturing a medical device according to claim 1, wherein the pH in the step of heating the solution ranges from pH 2.0 to 7.5.

3. The method of manufacturing a medical device according to claim 2, wherein the substrate is a material having a silicon atom.

4. The method of manufacturing a medical device according to claim 1, wherein the heating temperature in the step of heating the solution ranges from 80° C. to 130° C.

5. The method of manufacturing a medical device according to claim 1, wherein the substrate comprises one or more selected from the group consisting of tefilcon, tetrafilcon, helfilcon, mafilcon, polymacon, hioxifilcon, alfafilcon, omafilcon, hioxifilcon, nelfilcon, nesofilcon, hilafilcon, acofilcon, deltafilcon, etafilcon, focofilcon, ocufilcon, phemfilcon, methafilcon, and vilfilcon.

6. The method of manufacturing a medical device according to claim 1, wherein the substrate comprises one or more selected from the group consisting of lotrafilcon, galyfilcon, narafilcon, senofilcon, comfilcon, enfilcon, balafilcon, efrofilcon, fanfilcon, somofilcon, samfilcon, olifilcon, asmofilcon, formofilcon, stenfilcon, abafilcon, mangofilcon, riofilcon, sifilcon, larafilcon, and delefilcon.

7. The method of manufacturing a medical device according to claim 1, wherein the substrate is a material having a silicon atom.

8. The method of manufacturing a medical device according to claim 1, wherein the substrate is polymethyl methacrylate.

9. The method of manufacturing a medical device according to claim 1, wherein the substrate comprises one or more selected from the group consisting of neofocon, pasifocon, telefocon, silafocon, paflufocon, petrafocon, and fluorofocon.

10. The method of manufacturing a medical device according to claim 1, wherein the medical device is an ophthalmic lens, a skin dressing material, a wound dressing material, a skin protection material, a skin medicine carrier, an infusion tube, a gas delivery tube, a drainage tube, a blood circuit, a coating tube, a catheter, a stent, a sheath, a biosensor chip, a heart-lung machine, or an endoscope covering material.

11. The method of manufacturing a medical device according to claim 10,
   wherein the ophthalmic lens is a contact lens.

* * * * *